Feb. 26, 1929.

F. BEEMER 1,703,380

BALL BEARING OR CARRIER OR CONVEYER

Filed Feb. 7, 1927

WITNESS:

INVENTOR

Frank Beemer

BY

ATTORNEY.

Patented Feb. 26, 1929.

1,703,380

UNITED STATES PATENT OFFICE.

FRANK BEEMER, OF PHILADELPHIA, PENNSYLVANIA.

BALL BEARING OR CARRIER OR CONVEYER.

Application filed February 7, 1927. Serial No. 166,317.

Objects of the present invention are to provide simplicity both in manufacture and in assembly of parts; to afford strength and durability; and to insure efficient lubrication for a considerable time with opportunity for convenient introduction of additional lubricant, when necessary.

Other objects of the invention will appear from the following description at the end of which the invention will be claimed.

Figure 1:
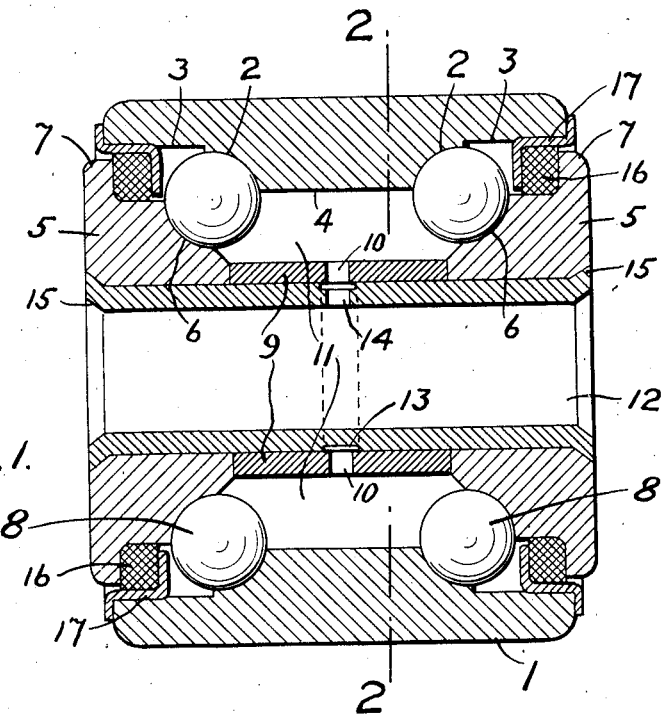
Figure 2:
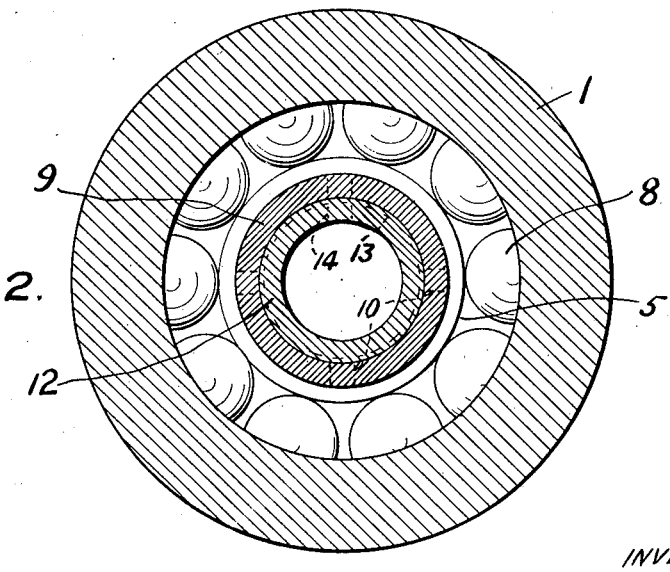

In the following description reference will be made to the accompanying drawing forming part hereof and in which Figure 1 is a sectional view taken through the axis of a bearing or conveyer roller embodying features of the invention, and Fig. 2 is a transverse sectional view of Fig. 1 taken on the line 2—2 in that figure.

In the drawing there is an outer cylinder 1 provided with spaced ball races 2 and having cylindrical walls 3 of increased diameter extending beyond the ball races and having a cylindrical wall 4 of decreased diameter arranged between the ball races. 5 indicates two rings spaced apart and having ball races 6 confronting the ball races 2, and having outwardly extending heads 7. There are two rings of balls 8. 9 represents a cylindrical spacer having an uninterrupted wall provided with lubricant holes indicated at 10 and of which four are shown but the number is not material. This spacer is arranged between the rings 5 and forms one wall of an annular lubricant receptacle generally indicated at 11 and of which the cylindrical surface 4 forms another wall. There is a cylindrical sleeve 12 having an uninterrupted wall and provided externally with a lubricant groove 13 and with a lubricant hole 14 communicating with the groove. The spacer 9 and rings 5 are mounted on the sleeve 12 and are secured by the provision of the expansions 15 at the ends of the sleeve. There are lubricant retainers bounding the lubricating chamber at its ends and arranged to abut on the radial wall of the heads 7 of the rings and on the inner and end walls of the extensions of the outer cylinder 1. These retainers comprise a ring of felt or like material 16, and a double flanged ring 17 arranged in the extension of the outer cylinder and of which one flange abuts on the inner face of the felt or like ring, and of which the other flange abuts on the ends of the extensions and positions the retainer.

The parts are of simple construction and the structure is strong. The parts may be readily assembled as will be readily understood by viewing Fig. 1 from the right-hand edge of the sheet considered as the base or horizontal.

In use the chamber 11 is filled with lubricant which may not escape because the sleeve 12 is mounted upon an axis which practically closes the hole 14. However, to renew the supply of lubricant the axis is removed and, for example, one end of the sleeve is closed and lubricant is injected into it from the other end. The lubricant finds its way to the chamber 11 through the hole 14, groove 13 and by one or more of the holes 10. The fact that the wall of the sleeve and the wall of the spacer are uninterrupted is of importance in retaining lubricant in the chamber or receptacle 11 and also in the provision of adequate strength.

I claim:

1. A ball bearing roller for carriers or conveyers comprising an outer cylinder provided with two spaced ball races having cylindrical walls of increased internal diameter extending beyond the races and having intermediate of the races an internal wall of decreased internal diameter, two rings spaced apart and having ball races confronting the first mentioned ball races and having outwardly extending heads, two rings of balls, a cylindrical spacer having an uninterrupted wall provided with lubricant holes and arranged between the rings and forming with the cylindrical wall of the outer ring a lubricant chamber, a cylindrical sleeve having an uninterrupted wall and provided externally with a lubricant groove and with a lubricant hole communicating with the groove, said spacer and rings being mounted on the sleeve and secured by the provision of expansions at the ends thereof, and lubricant retainers bounding the lubricant chamber at its ends and arranged to abut on the radial wall of the heads and on the extensions of the outer cylinder.

2. A ball bearing roller for carriers or conveyers comprising an outer cylinder provided with two spaced ball races having cylindrical walls of increased internal diameter extending beyond the races and having intermediate of the races an internal wall of decreased internal diameter, two rings spaced apart and having ball races confronting the first mentioned ball races and having outwardly extending heads, two rings of balls, a cylindrical spacer having an uninterrupted wall provided with lubricant holes and arranged between the rings and forming with the cylindrical wall of the outer ring a lubricant chamber, a cylindrical sleeve having an uninterrupted wall and provided externally with a lubricant groove and with a lubricant hole communicating with the groove, said spacer and rings being mounted on the sleeve and secured by the provision of expansions at the ends thereof, a textile ring abutting on the heads of the rings, and a flanged ring whereof one flange abuts on the textile ring and the other flange abuts on the extensions of the outer cylinder.

FRANK BEEMER.